United States Patent
Nguyen et al.

(10) Patent No.: US 9,264,237 B2
(45) Date of Patent: Feb. 16, 2016

(54) VERIFYING REQUESTS FOR ACCESS TO A SERVICE PROVIDER USING AN AUTHENTICATION COMPONENT

(75) Inventors: Duy Lan Nguyen, Newcastle, WA (US); Tolga Acar, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 531 days.

(21) Appl. No.: 13/160,831

(22) Filed: Jun. 15, 2011

(65) Prior Publication Data

US 2012/0324233 A1    Dec. 20, 2012

(51) Int. Cl.
*H04L 21/00* (2006.01)
*H04L 9/32* (2006.01)
*G06Q 20/34* (2012.01)

(52) U.S. Cl.
CPC ............ *H04L 9/3281* (2013.01); *G06Q 20/341* (2013.01)

(58) Field of Classification Search
CPC ....... H04L 9/32; H04L 9/3281; G06Q 20/341
USPC ............... 713/179, 176, 180; 726/5, 7, 10, 20
See application file for complete search history.

(56) References Cited

U.S. PATENT DOCUMENTS

| | | | |
|---|---|---|---|
| 6,092,201 A | 7/2000 | Turnbull et al. | |
| 8,032,932 B2 | 10/2011 | Speyer et al. | |
| 8,205,240 B2 | 6/2012 | Ansari et al. | |
| 8,220,035 B1* | 7/2012 | Pravetz | H04L 63/1483 715/749 |
| 8,341,714 B2 | 12/2012 | Muller et al. | |
| 8,806,595 B2 | 8/2014 | Nimashakavi et al. | |
| 2001/0045451 A1 | 11/2001 | Tan et al. | |
| 2005/0125669 A1 | 6/2005 | Stewart et al. | |
| 2005/0240763 A9* | 10/2005 | Bhat et al. | 713/169 |
| 2006/0021019 A1* | 1/2006 | Hinton et al. | 726/10 |
| 2006/0199165 A1* | 9/2006 | Crowhurst et al. | 434/350 |
| 2007/0274524 A1* | 11/2007 | Ksontini | H04W 12/12 380/270 |
| 2008/0244263 A1 | 10/2008 | Lindemann | |
| 2009/0113543 A1 | 4/2009 | Adams et al. | |
| 2009/0144540 A1 | 6/2009 | Davis et al. | |
| 2009/0204542 A1* | 8/2009 | Doman | G06F 21/33 705/50 |
| 2009/0235325 A1* | 9/2009 | Dimitrakos et al. | 726/1 |
| 2010/0031332 A1* | 2/2010 | Mason | 726/6 |

(Continued)

FOREIGN PATENT DOCUMENTS

CN      101616165 A      12/2009

OTHER PUBLICATIONS

Lin, et al., "Jack: Scalable Accumulator-based Nymble System", In Proceedings of the 9th annual ACM workshop on Privacy in the electronic society, Oct. 4, 2010, 10 pages.

(Continued)

*Primary Examiner* — Thu Ha Nguyen
(74) *Attorney, Agent, or Firm* — Alin Corie; Kate Drakos; Micky Minhas (57) ABSTRACT

The subject disclosure is directed towards processing requests for accessing a service provider. After examining at least one security token, a public key and a portion of attribute information are identified. An authentication component is accessed and applied to the public key. A unique user identifier is employed in generating the public key. The authentication component is generated using information from at least one revoked security token or at least one valid security token. The authentication component is configured to prove validity of the at least one security token.

20 Claims, 8 Drawing Sheets

(56) References Cited

U.S. PATENT DOCUMENTS

| | | | |
|---|---|---|---|
| 2010/0043065 A1* | 2/2010 | Bray et al. | 726/8 |
| 2011/0258454 A1 | 10/2011 | Qiu et al. | |
| 2011/0265172 A1 | 10/2011 | Sharma et al. | |
| 2011/0296510 A1 | 12/2011 | Hatlelid et al. | |
| 2012/0011578 A1* | 1/2012 | Hinton et al. | 726/8 |
| 2012/0036042 A1* | 2/2012 | Graylin et al. | 705/26.41 |
| 2012/0096272 A1* | 4/2012 | Jasper et al. | 713/176 |
| 2012/0151568 A1* | 6/2012 | Pieczul et al. | 726/8 |
| 2013/0007845 A1* | 1/2013 | Chang et al. | 726/4 |
| 2013/0124285 A1* | 5/2013 | Pravetz | G06Q 10/00 705/14.23 |
| 2013/0125197 A1* | 5/2013 | Pravetz | H04L 63/08 726/1 |
| 2013/0160099 A1* | 6/2013 | Fitzpatrick, III | 726/7 |
| 2013/0191884 A1* | 7/2013 | Leicher et al. | 726/4 |
| 2013/0247217 A1* | 9/2013 | Junod | H04L 63/10 726/27 |
| 2013/0318354 A1* | 11/2013 | Entschew | G06F 21/645 713/175 |
| 2014/0047518 A1* | 2/2014 | Pravetz et al. | 726/5 |
| 2014/0149741 A1* | 5/2014 | Balakrishnan | G06Q 21/385 713/159 |
| 2015/0032627 A1* | 1/2015 | Dill | G06Q 20/385 705/44 |

OTHER PUBLICATIONS

Henry, et al., "Formalizing Anonymous Blacklisting Systems", In Proceedings of the Symposium on Security and Privacy, May 22, 2011, 17 pages.

Ho, et al., "Group Access Control with Blacklist for Data Dissemination in Mobile Opportunistic Networks", In Proceedings of IEEE Wireless Communications and Networking Conference, Apr. 7, 2013, 6 pages.

"Second Written Opinion Issued in PCT Patent Application No. PCT/US2014/025120", Mailed Date: Mar. 9, 2015, 9 Pages.

Emura, et al., "A Certificate Revocable Anonymous Authentication Scheme with Designated Verifier", In proceedings of the International Conference on Availability, Reliability and Security, IEEE, Mar. 16, 2009, pp. 769-773.

Au, et al., "Constant-Size Dynamic k-TAA", In Proceedings of the 5th International Conference on Security and Cryptography for Network, Lecture Notes in Computer Science, vol. 4116, 2006, pp. 111-125.

Acar, et al., "Accumulators and U-Prove Revocation", In Proceedings of 17th International Conference on Financial Cryptography and Data Security, Lecture Notes in Computer Science, vol. 7859, 2013, pp. 189-196.

Camenish, et al., "An Accumulator Based on Bilinear Maps and Efficient Revocation for Anonymous Credentials", Irvine Proceedings of the 12th International Conference on Practice and Theory in Public Key Cryptography, Mar. 18, 2009, pp. 481-500.

"International Preliminary Report on Patentability Issued in PCT Patent Application No. PCT/US2014/025120", Mailed Date: Jun. 26, 2015, 11 Pages.

Zhang, et al., "Short Signature and Universal Designated Verifier Signature Without Random Oracles", In Proceedings of the Third International Conference on Applied Cryptography and Network Security, Lecture Notes in Computer Science, vol. 3531, May 5, 2005, pp. 483-498.

* cited by examiner

VERIFYING REQUESTS FOR ACCESS TO A SERVICE PROVIDER USING AN AUTHENTICATION COMPONENT

CROSS REFERENCE TO RELATED APPLICATIONS

This application is related to U.S. patent application Ser. No. 12/961,505 entitled "Revoking Delegatable Anonymous Credentials," filed Dec. 7, 2010.

BACKGROUND

Organizations are increasingly looking to securely identify users who access and utilize their services, both on the Internet and offline. These organizations also desire other identity-related information about these users that is stored at remote systems. These user authentication and data sharing imperatives are driven by cost and efficiency considerations, by new business models that leverage personal information, and by the explosive rise of phishing, identity theft, and other security threats. Conventional mechanisms for user authentication and data sharing, such as plastic cards and paper certificates, are costly, vulnerable to counterfeiting, and problematic for online use.

As a result, there is a rapidly growing interest in mechanisms (e.g., X.509 certificates) that can be implemented in software or hardware. However, these mechanisms are limited because they cannot be used without disclosing at least some information associated with the user. During an authentication process, when comparing a security token with a blacklist, the user must provide identity data in order to be verified. In some cases, an issuer may want to stop a particular user (i.e., Prover) from using the security token that has already been issued. For example, the Prover may be no longer qualified to use previously issued tokens or the attributes contained therein have become temporarily or permanently invalid. As another example, the user violated policies associated with a service provider.

For users whose security tokens were not revoked, proving validity cannot be accomplished without disclosing private and/or confidential information in the form of one or more encoded attributes. This is because the one or more attributes are used to generate the blacklist.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed to a mechanism that verifies a request to access various online services. For example, such a mechanism is employed to secure monetary or financial transactions over the Internet. As described herein, an authentication service issues security tokens that store cryptographic data for the purpose of authenticating the user. In one aspect, the authentication service includes a blacklist/whitelist authority that stores an accumulator representing at least one revoked security token (i.e., a blacklist) or at least one valid security token (i.e., a whitelist). Because the accumulator is not generated using any attribute information, non-membership or membership in the at least one revoked security token (i.e., the blacklist) or the at least one valid security token (i.e., the whitelist) may be determined using a unique user identifier. In one aspect, the authentication service generates the unique user identifier to maintain the blacklist or the whitelist. In one aspect, the unique user identifier enables security token authentication while allowing the user to remain anonymous as described herein.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards verifying requests for access to a service provider while controlling disclosure of confidential or private information. When requesting such access, a user provides a security token having a public key. In one implementation, such a public key includes a several digit long mathematical number that is generated using at least one unique user identifier. The service provider uses the public key and an authentication component to verify the security token and grant access to various online or offline services.

The authentication component can be used to determine membership or non-membership in a blacklist or a whitelist. For example, when selling or buying a car at an auction site, the authentication component proves validity of information associated with a car or the user; if the user already sold the car that is supposed to be for sale, a corresponding security token needs to be revoked and blacklisted. As another example, the authentication component may be used to verify identity claims when applying for unemployment benefits.

Figure 1:
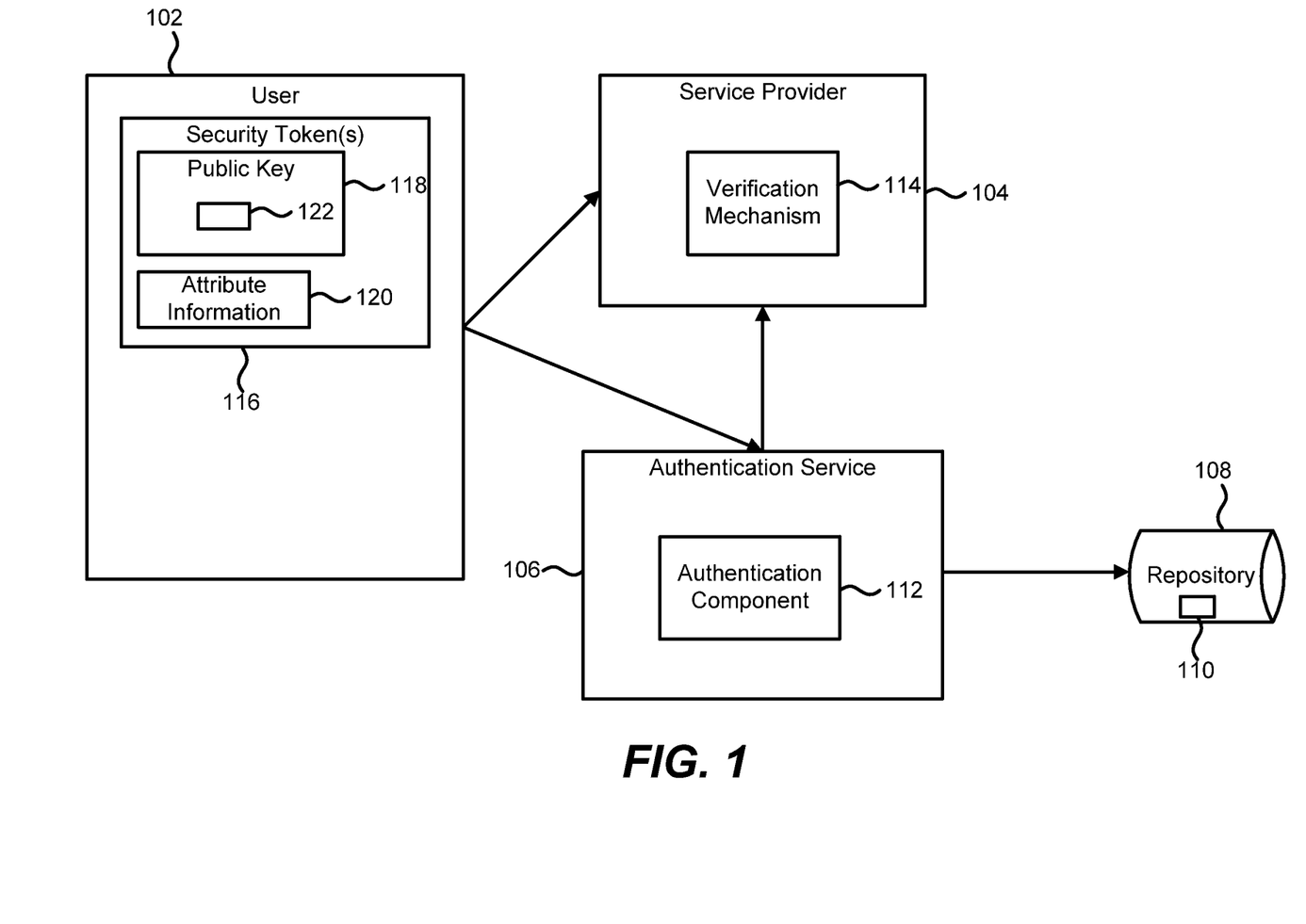
FIG. 1 is a block diagram illustrating an exemplary system for processing verification requests according to one implementation.

FIG. 1 is a block diagram illustrating an exemplary system for processing verification requests between a user 102 and a service provider 104 according to one implementation. An authentication service 106 provides a repository 108 for storing security information 110, and implements protocols for verifying an identity of the user 102 to third parties, such as the service provider 104. As will be understood, this is done without disclosing private or confidential information (e.g., social security numbers, credit card numbers, intellectual property, passwords and/or the like).

In one exemplary implementation, the security information 110 includes various mathematical numbers (e.g., numbers exceeding over 100 digits) that follow certain, well-known cryptographic principles. For example, the security information 110 includes public keys, encoded attributes and private keys associated with at least one revoked user. Alternatively, the security information 110 includes public keys, attributes and private keys for each valid user. The security information 110 also includes packages of mathematical numbers that, when applied to a corresponding public key, effectuate secure user verification for the service provider 104.

Furthermore, the security information 110 includes at least one unique identifier for each user, regardless of status, of the authentication service 106. The authentication service 106 accumulates user identifiers associated with the at least one revoked user to create a value representing each member (i.e., an accumulator). Such a value may exceed several hundred digits and constitute a portion of a blacklist according to some embodiments of the present disclosure. Similarly, user identifiers for the at least one valid user may be accumulated to form a whitelist.

As described herein, if the user 102 is not a member of the blacklist, or alternatively is a member of the whitelist, the security information 110 includes one or more witness values that complement the accumulator. Using the one or more witness values, the authentication service 106 generates the authentication component 112 for proving membership or non-membership while selecting disclosing certain attributes. The user 102 retains any information that is to remain private. In one exemplary embodiment, the user 102 only communicates a security token identifier and no other attribute.

The service provider 104 includes various online (i.e., Internet) properties that use security tokens to protect information stored within computer data. The service provider 104 implements a verification mechanism 114 for applying an authentication component 112 to a public key associated with the user 102 to determine membership or non-membership in either a group of revoked security tokens or valid security tokens as described herein.

The authentication service 106 issues at least one security token 116 comprising a public key 118 and attribute information 120. Each security token includes a different portion of the attribute information 120 such that the user 102 can selectively disclose private and/or confidential information. In one exemplary implementation, the authentication service 106 configures the public key 118 using at least one identifier 122 that uniquely identify the user 102. As described herein, if the user 102 requests access to the service provider 104, the verification mechanism 114 applies the authentication component 112 to the public key 118 to determine whether to grant or deny access.

Figure 2:
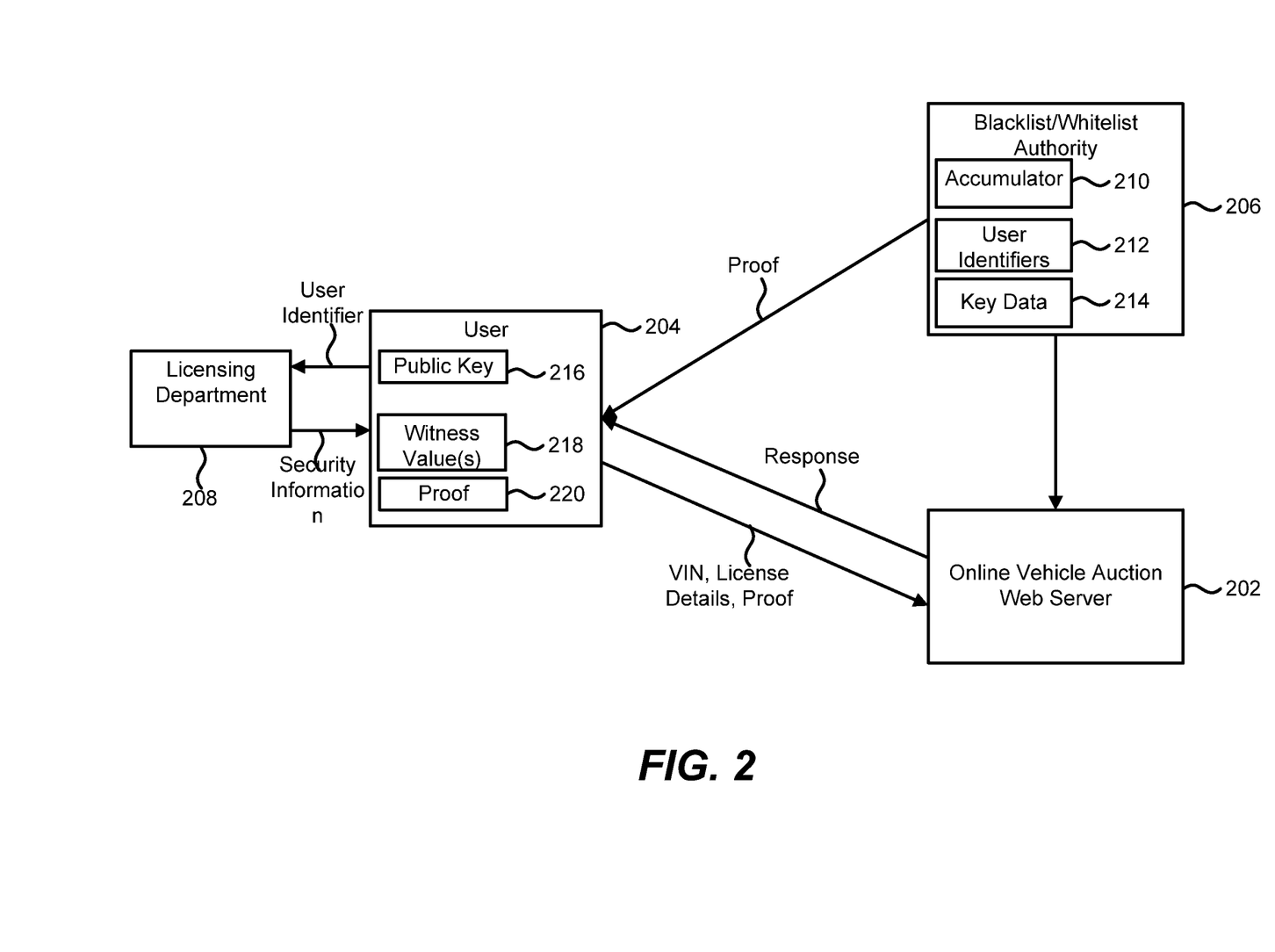
FIG. 2 is a block diagram illustrating an exemplary system for processing requests to access a service provider using an authentication component according to one alternative implementation.

FIG. 2 is a block diagram illustrating an exemplary system for processing requests to access a service provider using an authentication component. The exemplary system is an alternate implementation of the exemplary system described with respect to FIG. 1. FIG. 2 describes one example application of such a system when selling or buying a vehicle via online vehicle auction web server 202 using verified information associated with the vehicle or a user 204. The online vehicle auction web server 202 uses a blacklist/whitelist authority 206 to verify the ownership of the vehicle by the user 204.

The user 204 employs security token technology in order to selectively disclose information and still be permitted access to services provided by the online vehicle auction web server 202. A licensing department 208 generates at least one security token using a unique user identifier and issues the at least one security token to the user 204. As described herein, each security token includes a different combination of attributes, such as a Vehicle Identification Number (VIN), car make/model, token identifier, owner name, driver's license number and/or the like. Depending upon which attribute, if any, the user 204 desires to disclose, the licensing department 208 configures a valid security token with an encoding of only these attributes.

Using the blacklist/whitelist authority 206, the online vehicle auction web server 202 verifies the valid security token. Once the security token is used to complete a transaction via the online vehicle auction web server 202, the security token is revoked. In one exemplary implementation, the blacklist/whitelist authority 206 includes an accumulator 210 representing at least one revoked security token. Alternatively, the accumulator 210 represents at least one valid security token. In either implementation, the blacklist/whitelist authority 206 computes the accumulator 210 using one or more user identifiers 212 and key data 214.

The blacklist/whitelist authority 206 uses the accumulator 210, the key data 214 and a public key 216 issued to the user 204 to produce at least one witness value 218. The accumulator 210 and the at least one witness value 218 may be based on a Diffie-Hellman assumption. As described herein, a proof 220 is generated using the at least one witness value in order to verify that the security token of the user 204 is not revoked and therefore, valid.

The proof 220 includes a non-membership proof or a membership proof that enhances security at the online vehicle auction web server 202. The membership proof proves that a specific element (i.e. user identifier) is accumulated (e.g., the user is whitelisted). The non-membership proof proves that a specific element is not accumulated, (e.g., the user is blacklisted). Using the proof 220, a verification mechanism within the online vehicle auction web server 202 computes only two pairings. As illustrated below, expensive exponentiations in target group $G_T$ are moved to $G_1$.

Let $\mathcal{G}_1$ and $\mathcal{G}_2$ be cyclic multiplicative groups generated by $P_1$ and $P_2$, respectively, whose orders are a prime q, and $\mathcal{G}_T$ be a cyclic multiplicative group with the same order. Let e: $\mathcal{G}_1 \times \mathcal{G}_2 \to \mathcal{G}_T$ be a bilinear pairing with the following properties:
1. Bilinearity: $e(P^a, Q^b) = e(P, Q)^{ab}$ for all $P \in \mathcal{G}_1$, $Q \in \mathcal{G}_2$, a, b $\in \mathbb{Z}_q$
2. Non-degeneracy: $e(P^a, Q^b) \neq 1$
3. Computability: There is an efficient algorithm to compute $e(P,Q)$ for all $P \in \mathcal{G}_1$, $Q \in \mathcal{G}_2$ For a group $\mathcal{G}$ of prime order, hereafter denote the set $\mathcal{G}^* = \mathcal{G} \setminus \{O\}$ where O is the identity element of the group. A Bilinear Pairing Instance Generator is defined as a Probabilistic Polynomial Time (PPT) algorithm BPG (Bilinear Pairing Generator) that takes as input a security parameter l and returns a uniformly random (q, $\mathcal{G}_1$, $\mathcal{G}_2$, $\mathcal{G}_T$, e, $P_1$, $P_2$) of bilinear pairing parameters, where q of size l. Hereafter, unless stated otherwise, the computations of elements in $\mathbb{Z}_q$ are assumed to be in mod q.

The algorithm BPG is used to create bilinear pairing parameters (q, $\mathcal{G}_1$, $\mathcal{G}_2$, $\mathcal{G}_T$, e, $P_1$, $P_2$), generate $\delta \in \mathbb{Z}_q^*$; H, $G_1 \in \mathcal{G}_1$ and compute $P_{pub} = P_2^\delta$ and $K = H^\delta$. The corresponding domain for elements to be accumulated is $\mathbb{Z}_q \setminus \{-\delta\}$. The private key is labeled $\delta$ and the public key is labeled pka=(q, $\mathcal{G}_1$, $\mathcal{G}_2$, $\mathcal{G}_T$, e, $P_1$, $P_2$, $P_{pub}$, H, K, $G_1$). Both keys are stored in the key data 214.

Optionally, for efficient witness computation, a tuple $t = (P_1, P_1^\delta, P_1^{\delta^2}, \ldots, P_1^{\delta^k})$ is published, where k is the upper bound on the number of elements to be accumulated. According to exemplary implementations with the knowledge of $\delta$, k can be easily increased to accumulate more values.

For a set $\{x_1, \ldots, x_m\} \in \mathbb{Z}_q \setminus \{-\delta\}$ where $m \leq k$, the accumulator 210 $V = p_1^{\prod_{i=1}^{m}(\delta + x_i)}$ is computable in polynomial time. With knowledge of private key $\delta$, computing V costs around 1 exponentiation. Without knowledge of key $\delta$ and with knowledge of t, it costs around m exponentiations.

In one implementation, for a x not in the set, the at least one witness value 218 is labeled by (W, d, Q) and computed using an expression, such as $(W = P1(i=1m(\delta+xi)-d)/(\delta+x)$, $d = i = 1m(\delta+xi) \bmod \delta + x \in \mathbb{Z}q$, $Q = VW - xP1 - d$, proving that x is not accumulated in V (then $Q = W^\delta$). With knowledge of the private key $\delta$, computing witness values costs around three exponentiations. Without knowledge of key $\delta$ and with knowledge of t, it costs around m+1 exponentiations.

If there are several members added or deleted to the blacklist or the whitelist, the algorithm BPG is used to update Q after completely updating W, d.

In exemplary implementations associated with member addition, when a new x' is accumulated, a new witness (W', d', Q') of x can be computed as $(W' = VWx' - x, d' = dx' - x, Q' = V'W' - xP1 - d'$ where V' is the new accumulating value. For exemplary implementations involving member deletion, when an accumulated x' is removed, the new witness (W', d', Q') of x can be computed as $$\left(W' = (V'^{-1}W)^{\frac{1}{x'-x}}, d' = d/(x'-x), Q' = V'W'^{-x}P_1^{-d'}\right).$$

As described herein, the at least one witness values 218 is used to generate the proof 220. For a x that is not accumulated, proving that x is not accumulated is equivalent to the following expression:

$PK\{(W,d,x): V = W^{\delta+x}P_1^d \wedge d \neq 0\}$

Let $X := WH^{t_1}$ and $Y := QK^{t_1}$ (then $Y = X^\delta$), then the previous expression is equivalent to:

$PK\{(t_1,d,x): e(Y,P_2) = e(x,P_{pub}) \wedge VY^{-1} = X^x H^{-t_1 x} K^{-t_1} P_1^d \wedge d \neq 0\}$ In the following proof, $T_3$, $T_4$, $s_5$, $s_6$ show the existence of $d^{-1}$, therefore $d \neq 0$. Commitment of x could vary, so a presentation protocol between the online vehicle auction web server 202 and the user 204 varies. In one exemplary implementation, the non-membership proof for x's commitment $C := G_1^x H^u$ is generated as follows:

1. Generate $t_0, t_1, t_2, t_3, k_0, \ldots, k_8 \in_R \mathbb{Z}_q$
2. Compute $A := G_1^{k_0} H^{r_0}$ $X := WH^{t_1}; Y := QK^{t_1}; R := G_1^{r_1} H^{r_2}; S := G_1^{d^{-1}} H^{r_3}$ $T_1 := G_1^{k_1} H^{k_2}; T_2 := G_1^{k_7} H^{k_4} R^{-k_0}; T_3 := G_1^{k_6} H^{k_3}; T_4 := H^{k_8} S^{-k_5}$ $\Gamma := X^{-k_0} H^{k_7} K^{k_1} P_1^{-k_5}$ 3. Compute hash challenge $c := \mathcal{H}(pka,C,A,X,Y,R,S,T_1,T_2,T_3,T_4,\Gamma)$ 4. Compute $r_0 := -cu + t_0 \bmod q; s_0 := -cx + k_0 \bmod q$ for each $i \in \{1,2,3\}, s_i := -ct_i + k_i \bmod q$ $s_4 := -ct_2 x + k_4 \bmod q; s_5 := -cd + k_5 \bmod q$ $s_6 := -cd^{-1} + k_6 \bmod q; s_7 := -ct_1 x + k_7 \bmod q$ $s_8 := -ct_3 d + k_8 \bmod q$ Delete $t_0, t_1, t_2, t_3, k_0, \ldots, k_8$ 5. Return the generated proof is $c, r_0, s_0, \ldots, s_8, X, Y, R, S$ In one exemplary implementation, the verification mechanism within the online vehicle auction web server 202 verifies the non-membership proof labeled $c, r_0, s_0, \ldots, s_8, X, Y, R, S$ for x's commitment $C := G_1^x H^u$ as follows:
1. Compute $A := G_1^{s_0} H^{r_0} C^c$ $T_1 := G_1^{s_1} H^{s_2} R^c; T_2 := G_1^{s_7} H^{s_4} R^{-s_0};$ $T_3 := G_1^{s_6} H^{s_3} S^c; T_4 := G_1^{-c} H^{s_8} S^{-s_5};$ $\Gamma := X^{-s_0} H^{s_7} K^{s_1} P_1^{-s_5} (V^{-1}Y)^c$ 2. Verify that $c =_? \mathcal{H}(pka,C,A,X,Y,R,S,T_1,T_2,T_3,T_4,\Gamma)$ $e(Y,P_2) =_? e(X,P_{pub})$ With respect to embodiments where the proof 220 is a membership proof for the whitelist, a membership witness (W, Q) is computed using an expression $(W = P_1^{\prod_{i=1}^{m}(\delta+x_i)/(\delta+x)}, Q = VW^{-x})$ for a x in the set. Hence, (W, Q) is the witness indicating that x is accumulated in V (then $Q = W^\delta$). With knowledge of private key $\delta$, computing the membership witness costs around 2 exponentiations. Without knowledge of key $\delta$ and with knowledge of t, computing the membership witness costs around m exponentiations.

In the following updates, when members are added or deleted to the whitelist, the algorithm BPG only updates Q after completely updating W. In one exemplary implementation of member addition, when a new x' is accumulated, a new witness (W', Q') of x can be computed as $(w' = VW^{(x'-x)}, Q' = V'W'^{-x})$, where V' is the new accumulating value. In one exemplary implementation of member deletion, when an accumulated x' is removed, the new witness (W', Q') of x can be computed as $$\left(W' = (V'^{-1}W)^{\frac{1}{x'-x}}, Q' = V'W'^{-x}\right).$$

For an accumulated x, proving that x is accumulated is equivalent to the following expression:

$PK\{(W,x): V = W^{\delta+x}\}$

Let $X := WH^{t_1}$ and $Y := QK^{t_1}$ (then $Y = X^\delta$), this is equivalent to:

$PK\{(t_1,x): e(Y,P_2) = e(X,P_{pub}) \wedge VY^{-1} = X^x H^{-t_1 x} K^{-t_1}\}$ Because commitment of x could vary, the presentation protocol also varies. The membership proof for x's commitment $C := G_1^x H^u$ may be generated as follows.
1. Generate $t_0, t_1, t_2, k_0, \ldots, k_4 \in_R \mathbb{Z}_q$ and compute $A := G_1^{K_0} H^{r_0}$ $X := WH^{t_1}; Y := QK^{t_1}; R := G_1^{r_1} H^{r_2}$ $T_1 := G_1^{k_1} H^{k_2}; T_2 := G_1^{k_3} H^{k_4} R^{-k_0}; \Gamma := X^{-k_0} H^{k_3} K^{k_1}$ 2. Compute hash challenge $c := \mathcal{H}(pka,C,A,X,Y,R,T_1,T_2,\Gamma)$ 3. Compute $r_0 := -cu + t_0 \bmod q; s_0 := -cx + k_0 \bmod q$ for each $i \in \{1,2\}, s_i := -ct_i + k_i \bmod q$ $s_3 := -ct_1 x + k_3 \bmod q; s_4 := -ct_2 x + k_4 \bmod q$ Delete $t_0, t_1, t_2, k_0, \ldots, k_4$ 4. Generate Proof $c, r_0, s_0, \ldots, s_4, X, Y, R$ In one exemplary implementation, the verification mechanism within the online vehicle auction web server 202 verifies the membership proof labeled c, $r_0$, $s_0$, . . . , $s_4$, X, Y, R for commitment $C := G_1^x H^u$ as follows:

5. Compute $A := G_1^{s_0} H^{r_0} C^c$ $T_1 := G_1^{s_1} H^{s_2} R^c ; T_2 := G_1^{s_3} H^{s_4} R^{-s_0} ; \Gamma := X^{-s_0} H^{s_3} K^{s_1} (V^{-1} Y)^c$ 6. Verify that $C =_? \mathcal{H}(pka, C, A, X, Y, R, T_1, T_2, \Gamma)$ $e(Y, P_2) =_? e(X, P_{pub})$ The proof 220 enables the blacklist/whitelist authority 206 to revoke security token based on the user identifiers 212 and, in some implementations, one or more attributes. Once revoked the public key 216 associated with the user 204 cannot be used again.

Generating bilinear pairing parameters results in the following: $UID_P$, (p, q, g), $UID_{\mathcal{H}}$, ($g_0, g_1, \ldots, g_n, g_t, g_{id}$), ($e_1, \ldots, e_n$), S and private key $y_0 \in \mathbb{Z}_q$. $UID_P$ includes an octet string that holds an application-specific unique identifier for these parameters. $UID_{\mathcal{H}}$ is an identifier of a cryptographically secure hash algorithm. ($e_1, \ldots, e_n$) is a list of byte values indicating whether or not the attribute values ($A_1, \ldots, A_n$) are hashed when computing the public key 216.

An authentication service that issued the public key 216 is ($g_0, g_1, \ldots, g_n, g_t, g_{id}$). To generate $g_0$, the authentication service generates a private key at random from $\mathbb{Z}_q^*$ and computes $g_0 := g^{y_0}$.

These parameters are used to generate security tokens having a format of $UID_P$, h, TI, PI, $\sigma'_z$, $\sigma'_c$, $\sigma'_r$. TI$\in\{0,1\}^*$ is the value of a token information field. The token information field is used to encode token-specific information that is always disclosed to service providers, such as token usage restrictions, a validity period or token metadata. PI$\in\{0,1\}^*$ is the value of the prover information field. The prover is also known as the user 202 seeking verification and requesting access. The Prover information field is used to encode Prover-asserted information hidden from the authentication service, such as contact information, an encryption key and/or the like. $\sigma'_z$, $\sigma'_c$, $\sigma'_r$ form a digital signature associated with the authentication service (i.e., Issuer).

A private key of the security token includes the value $\alpha^{-1} \in \mathbb{Z}_q^*$. The public key 216 is labeled $h = (g_0 g_1^{x_1} \ldots g_n^{x_n} g_t^{x_t} g_{id}^{x_{id}})^\alpha$ mod p where $x_{id} \in \mathbb{Z}_q \setminus \{-\delta\}$ is generated as a unique user identifier. To blacklist an identity, the blacklist/whitelist authority 206 accumulates $x_{id}$. In one exemplary implementation, $x_{id}$ uniquely identifies a security token, the user 204 or an organization.

Figure 3:
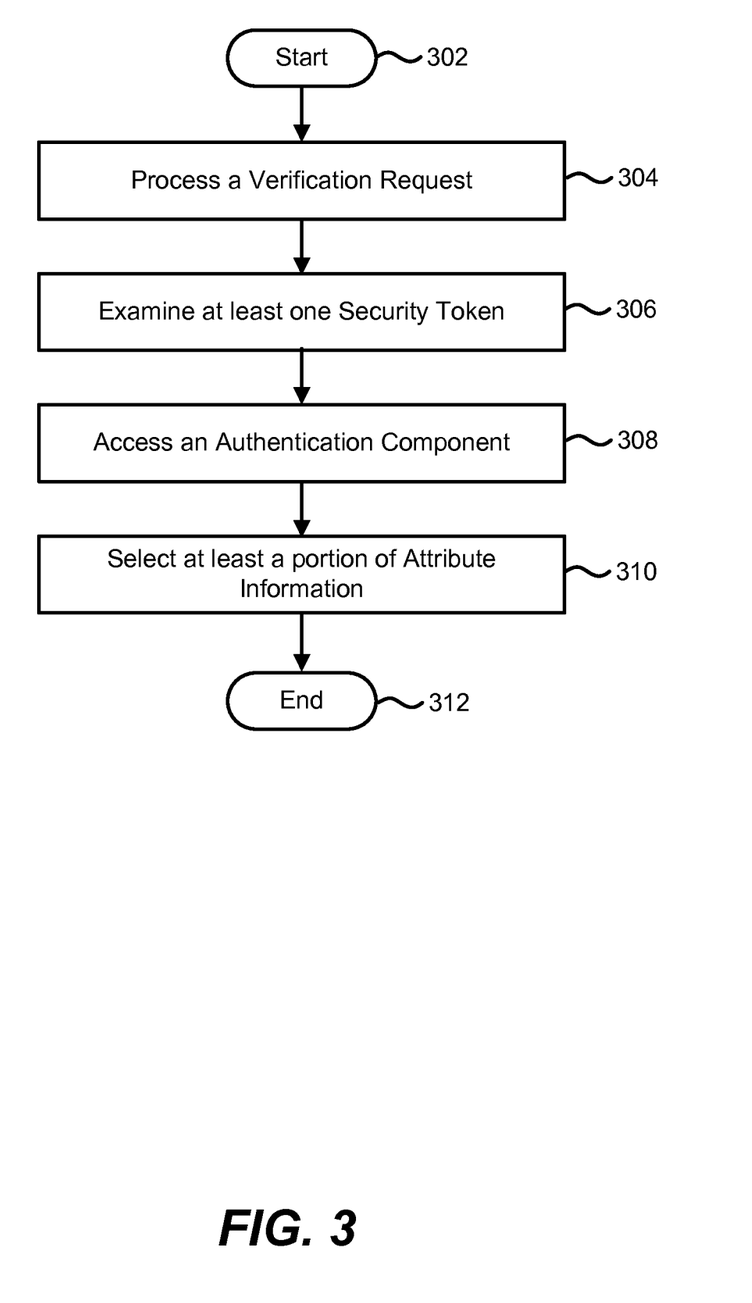
FIG. 3 is a flow diagram illustrating steps exemplary system for processing verification requests.

Generating the security token may be performed as follows:

1. $x_t := \text{ComputeXt}(TI); x_{id} := \text{ComputeXid}()$
2. for each i$\in\{1, \ldots, n\}$, $x_i := \text{ComputeXi}(A_i)$
3. Compute $y := g_0 g_1^{x_1} \ldots g_n^{x_n} g_t^{x_t} g_{id}^{x_{id}}$ mod p
4. Compute issuance values: ($z_0, z_1, \ldots, z_n, z_t, z_{id}$)$\in G_q$
5. Generate $\sigma_z := z_0 z_1^{x_1} \ldots z_n^{x_n} z_t^{x_t} z_{id}^{x_{id}}$ mod p
6. Generate Prover information field value: PI$\in\{0,1\}^*$ FIG. 3 is a flow diagram illustrating steps exemplary system for processing verification requests from a service provider. Steps depicted in FIG. 3 commence at step 302 and proceed to step 304 when a verification request for accessing a service provider is processed. In one implementation, the step 302 to step 312 are performed by various software modules, such as the verification mechanism 114 of FIG. 1 as described herein.

Step 306 represents an examination of at least security token. As described herein, each of the at least one security token includes a different portions of attribute information as well as a public key. Along with a proof, the public key is used to verify information purported by a user. Step 308 illustrates accessing an authentication component that comprises such a proof. In one exemplary implementation, a membership proof determines whether the security token is a member of a whitelist and therefore, valid. Alternatively, a non-membership proof determines whether the security token is a member of a blacklist and therefore, revoked.

Step 310 represents selective disclosure of attribute information. A user may choose to communicate at least a portion or no portion of the attribute information along with the public key. Step 312 refers to termination of the steps described herein.

Figure 4:
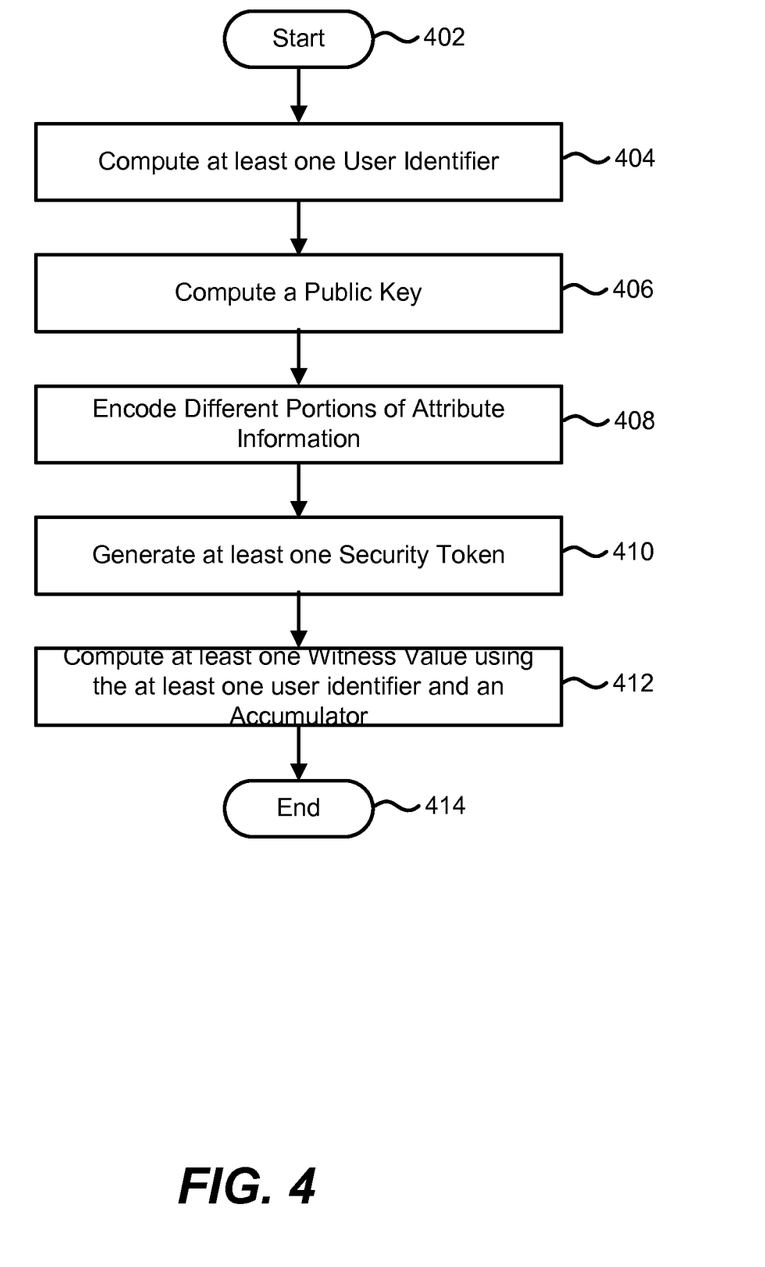
FIG. 4 is a flow diagram illustrating exemplary steps for issuing at least one security token using at least one user identifier.

FIG. 4 is a flow diagram illustrating steps for issuing at least one security token using at least one user identifier. Steps depicted in FIG. 4 commence at step 402 and proceed to step 404 when at least one unique user identifier is computed. In one implementation, the step 402 to step 414 are performed by various software modules, such as the authentication service 106 of FIG. 1 as described herein.

Step 406 represents computation of a public key for a user. As described herein, the public key is generated using the at least one user identifier. Step 408 represents encoding of different portions of attribute information. Step 410 represents the generation of the at least one security token where each has a different portion or no portion of the attribute information to enable selective disclosure of such information by the user.

Step 412 represents computation of at least one witness value using the at least one user identifier and an accumulator representing at least one revoked security token or at least one valid security token. In one implementation, the at least one security token is valid and the at least one user identifier is not accumulated in the blacklist. In another implementation, the at least one security token was pending while the user completed the transaction with a prior security token. Hence, the at least one security token is not valid. The authentication service revoked these security tokens and accumulates the at least one user identifier and produce a new accumulator. Performance of step 402 to step 412 terminate at step 414.

Figure 5:
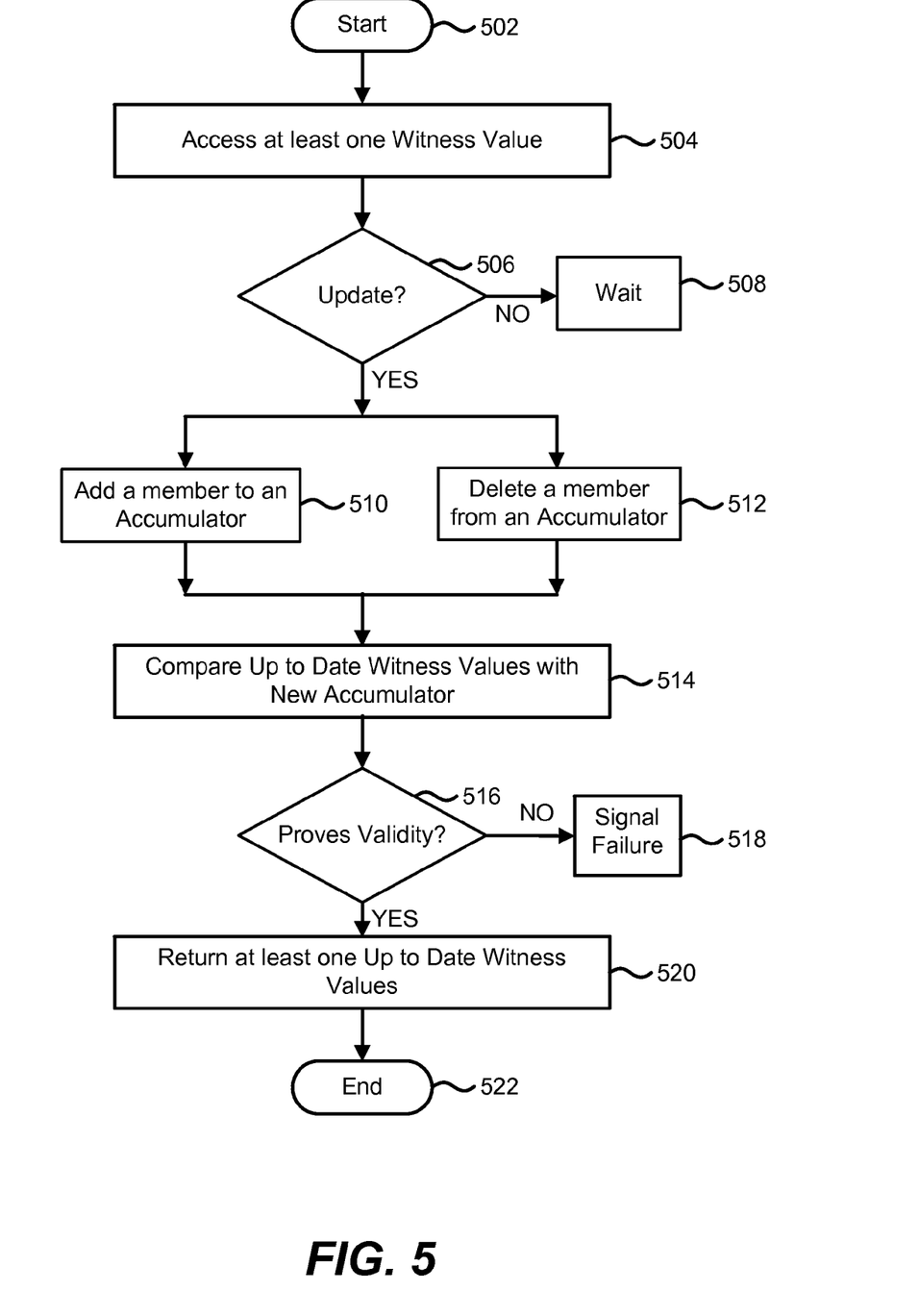
FIG. 5 is a flow diagram illustrating exemplary steps for updating at least one witness value.

FIG. 5 is a flow diagram illustrating steps for updating at least one witness value. Steps depicted in FIG. 5 commence at step 502 and proceed to step 504 when at least one witness value is accessed. In one implementation, the step 502 to step 522 are performed by various software modules, such as the authentication service of FIG. 1 as described herein.

Step 506 represents a determination as to whether to update the at least one witness value in response to a member addition or member deletion at a blacklist or a whitelist. If no such addition or deletion occurred, execution of these steps waits at step 508. If such an addition or deletion occurred, the at least one witness value is updated to reflect a new accumulator. Step 510 represents implementations that add members to the accumulator and compute up to date witness values. Step 512 represents implementations that delete members from the accumulator and compute up to date witness values.

Step 514 represents a comparison of the at least one up to date witness values with the new accumulator. Step 514 is executed in order to verify that the at least one witness value complements the new accumulator and proves that a user identifier is not accumulated in the blacklist. This ensures a service provider that a security token is indeed valid. Alternatively, the at least one witness value proves that the user identifier is accumulated in the whitelist. Step 514 also illustrates generation of a membership or a non-membership proof.

Step 516 represents a determination as to whether the membership or the non-membership proof proves validity. If the at least one witness value and the accumulator do not prove validity, step 518 signals a failure. If, on the other hand, validity is proven, step 520 is performed during which the at least one up to date witness values are returned to a user. Step 522 represents termination.

Figure 6:
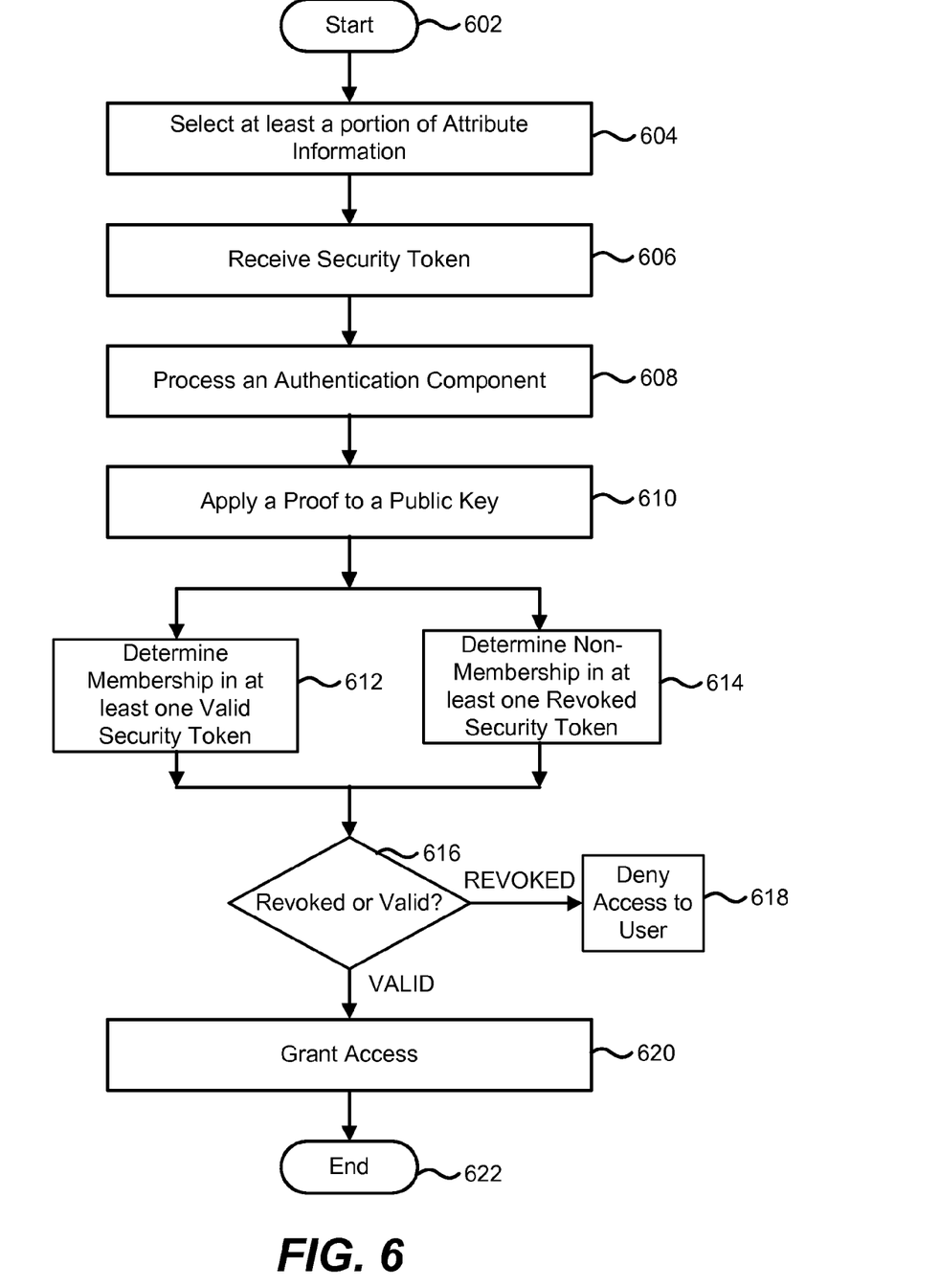
FIG. 6 is a flow diagram illustrating exemplary steps for verifying a security token using an authentication component.

FIG. 6 is a flow diagram illustrating steps for verifying a security token using an authentication component. Steps depicted in FIG. 6 commence at step 602 and proceed to step 604 when at least a portion of attribute information is selected. In one implementation, the step 602 to step 616 are performed by various software modules, such as the verification mechanism 114 of FIG. 1 as described herein.

Step 606 represents reception of a security token from a user. In one exemplary implementation, a service provider and a user negotiate which attributes to disclose before denying or granting access. The user and the service provider may decide that no attribute is to be disclosed in order to verify the security token. An authentication service issues the security token to the user along with a public key. When requesting access, the user communicates the security token.

Step 608 represents processing of an authentication component. In one exemplary implementation, the service provider requests the authentication component from the authentication service. The authentication request includes a proof, such as a membership proof or a non-membership proof, which determines validity of the security token. Step 610 illustrates application of the proof to the public key associated with the security token. Step 612 is executed for membership proofs while step 614 is executed for non-membership proofs.

If the proof includes the membership proof, step 612 represents determining membership in a group comprising at least one valid security token. On the other hand, if the proof includes the non-membership proof, step 614 represents determining non-membership in a group comprising at least one revoked security token. Step 616 represents a determination as to whether the security token is revoked or valid based on the application of the proof to the public key. If the security token is revoked, step 618 illustrates denial of access to the user. If the security token is valid, step 620 illustrates granting of access to the user. Step 622 represents termination of these steps.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
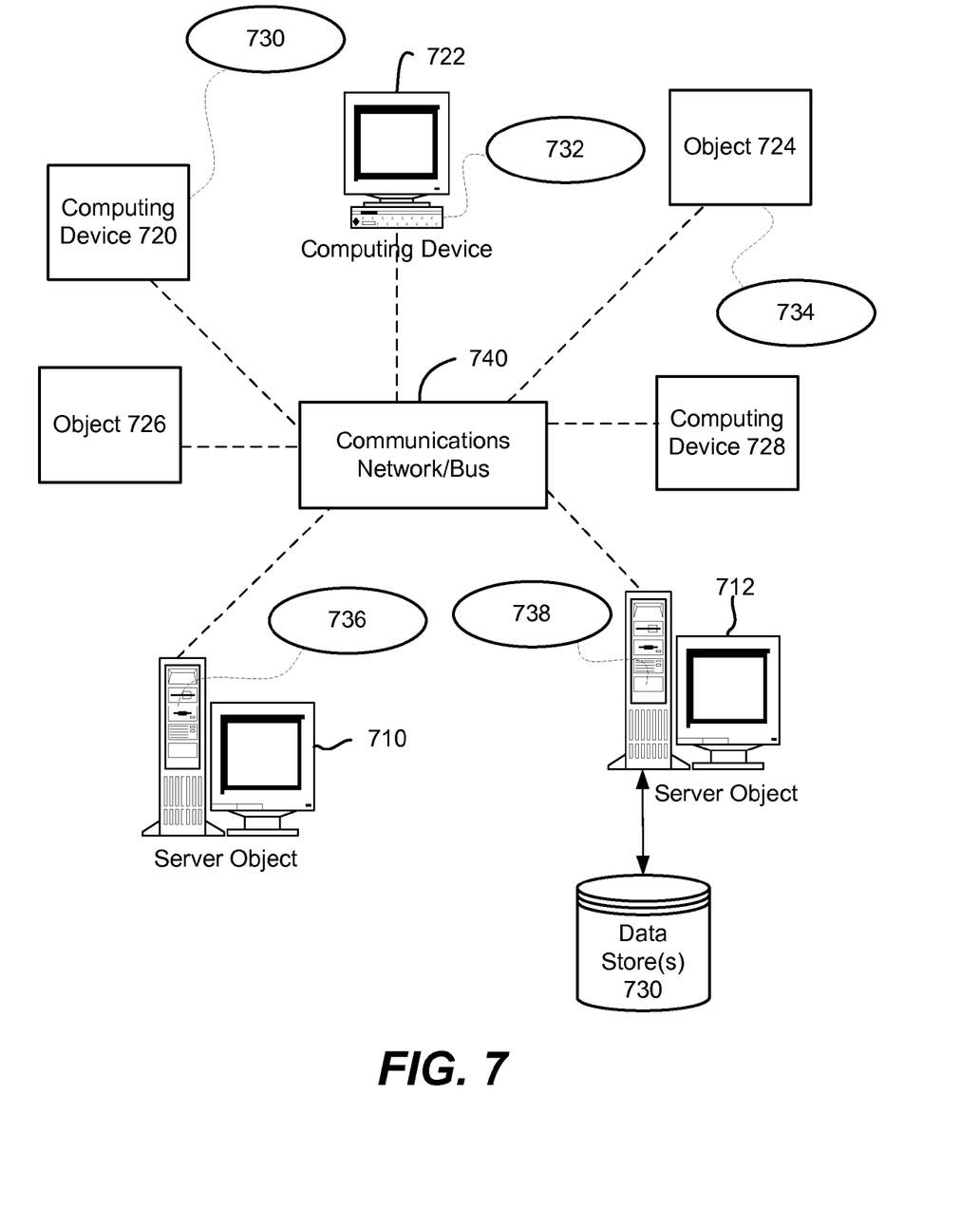
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
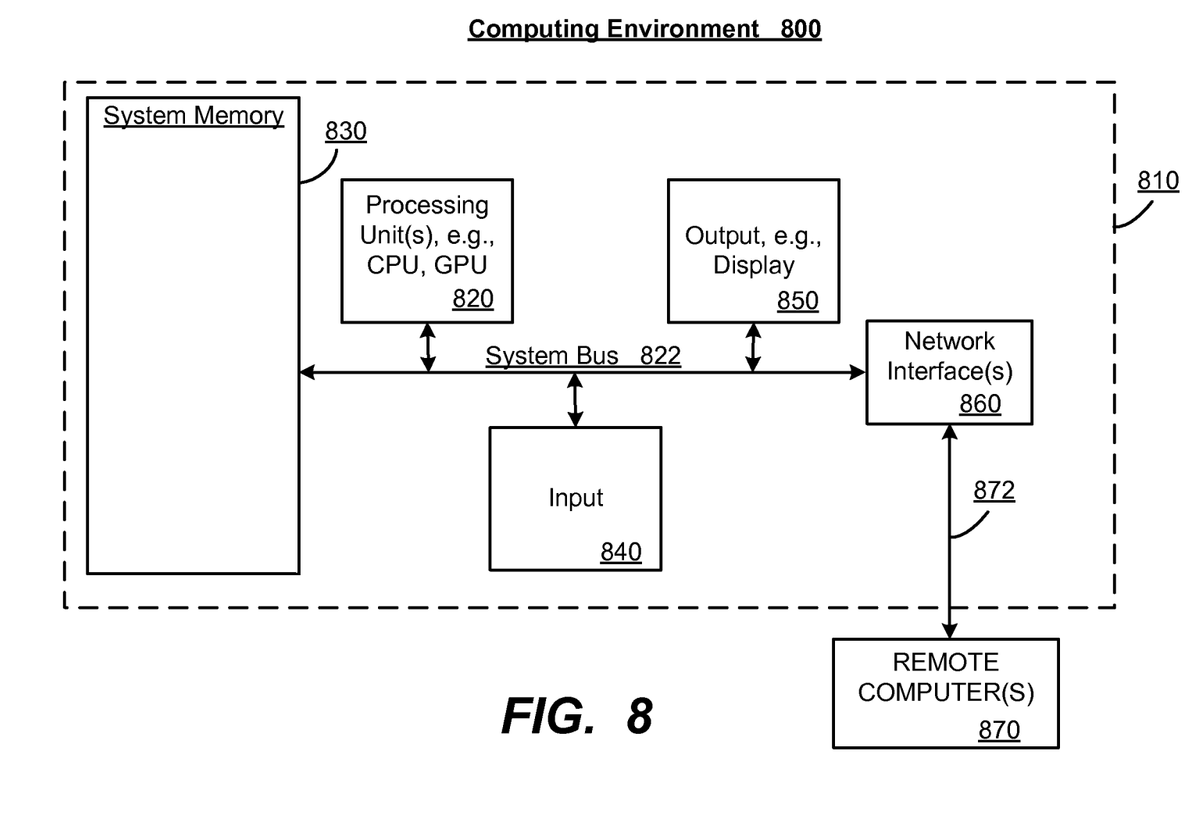
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for processing at least one verification request for accessing a service provider, the method performed at least in part on at least one processor, the method comprising:

examining at least one security token received from a user, wherein the at least one security token and a public key are configured using at least one user identifier associated with the user;

accessing an authentication component that is generated using at least one revoked security token or at least one valid security token, the authentication component including at least one of a blacklist including the at least one revoked security token or a whitelist including the at least one valid security token;

applying the authentication component to the public key to verify the security token, wherein the authentication component is configured to prove validity of the at least one security token; and revoking the at least one security token based on the validity of the at least one security token by one of adding the at least one security token to the blacklist or removing the at least one security token from the whitelist.

2. The method of claim 1 wherein applying the authentication component comprises using a membership proof to determine whether the at least one security token is valid, wherein, upon revocation of the at least one security token, the at least one security token and the public key are invalidated such that the at least one security token and the public key are not valid in a subsequent verification request.

3. The method of claim 2 further comprising computing an accumulator using at least one private key and at least one user identifier associated with the at least one revoked security token or the at least one valid security token.

4. The method of claim 3 wherein accessing the authentication component further comprises generating at least one witness value using a private key corresponding with the at least one security token, wherein the at least one witness value complements the accumulator.

5. The method of claim 3, wherein accessing the authentication component further comprises updating at least one witness value using the accumulator and a new accumulator.

6. The method of claim 5, wherein accessing the authentication component further comprises generating the authentication component using the at least one witness value and the attribute information.

7. The method of claim 1, wherein accessing the authentication component further comprises determining membership or non-membership within the at least one revoked security token or the at least one valid security token.

8. The method of claim 1, wherein the at least one security token comprises at least a portion of attribute information.

9. The method of claim 1, wherein examining the at least one security token further comprises computing the at least one user identifier.

10. In a computing environment, a system, comprising:
a memory, wherein the memory comprises computer useable program code;
one or more processing units coupled to the memory; and
a verification mechanism implemented on the one or more processing units and coupled to an authentication service for issuing at least one security token to a user and computing an authentication component, wherein the authentication component is utilized to determine membership of the user to a blacklist or a whitelist using a private key associated with at least one user identifier and at least one private key associated with at least one revoked security token included on the blacklist or at least one valid security token included on the whitelist, wherein the at least one security token is configured to use at least one user identifier, and wherein the verification mechanism is configured to apply the authentication component to a public key associated with the at least one user identifier to provide validity of the at least one security token, and revoke the at least one security token by one of adding the at least one security token to the blacklist or removing the at least one security token from the whitelist.

11. The system of claim 10, wherein the verification mechanism selects at least one portion of attribute information.

12. The system of claim 10, wherein the verification mechanism applies the authentication component to a public key stored in a security token of the at least one security token, wherein the security token of the at least one security token comprises an encoding of the at least one portion of the attribute information.

13. The system of claim 10, wherein authentication service compares at least one witness value with an accumulator representing the at least one revoked security token or the at least one valid security token.

14. The system of claim 10, wherein the authentication service updates at least one witness value using the accumulator and a new accumulator, wherein the at least one witness value is used to generate the authentication component.

15. The system of claim 10, wherein the verification mechanism determines membership or non-membership of the user within the blacklist or the whitelist.

16. The system of claim 10, wherein the authentication service computes the at least one user identifier.

17. One or more computer storage devices having computer-executable instructions, which upon execution perform operations, comprising:

processing a security token from at least one user, wherein the security token is either a revoked security token included on a blacklist or a valid security token included on a whitelist; and accessing an authentication component associated with the security token for proving validity of the at least one security token to the service provider, wherein the authentication component is generated using at least one user identifier associated with at least one revoked security token included on the blacklist or at least one valid security token included on the whitelist and at least a portion of the attribute information, and revoking the at least one security token based on the validity of the at least one security token by one of adding the at least one security token to the blacklist or removing the at least one security token from the whitelist.

18. The one or more computer storage devices of claim 17 having further computer-executable instructions comprising:
applying the authentication component to the public key.

19. The one or more computer storage devices of claim 17 having further computer-executable instructions comprising:
determining membership or non-membership within the blacklist or the whitelist.

20. The one or more computer storage devices of claim 17 having further computer-executable instructions comprising:
selecting the at least a portion of the attribute information to be encoded on a security of the at least one security token that is communicated to the service provider.

* * * * *